(12) United States Patent
Nitta

(10) Patent No.: US 8,415,410 B2
(45) Date of Patent: Apr. 9, 2013

(54) AROMATIC POLYCARBONATE RESIN COMPOSITION AND A MOLDED ARTICLE THEREOF

(75) Inventor: Akihiro Nitta, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 12/935,422

(22) PCT Filed: Mar. 26, 2009

(86) PCT No.: PCT/JP2009/056833
§ 371 (c)(1),
(2), (4) Date: Sep. 29, 2010

(87) PCT Pub. No.: WO2009/123271
PCT Pub. Date: Oct. 8, 2009

(65) Prior Publication Data
US 2011/0028601 A1    Feb. 3, 2011

(30) Foreign Application Priority Data

Mar. 31, 2008  (JP) ................ 2008-090880
Jan. 22, 2009  (JP) ................ 2009-011912

(51) Int. Cl.
*C08K 9/00*  (2006.01)
*C08K 3/10*  (2006.01)

(52) U.S. Cl.
USPC .......... 523/205; 523/210; 524/403; 524/404; 524/408; 524/413; 524/428

(58) Field of Classification Search .............. 523/205, 523/210; 524/403, 404, 408, 413, 428
See application file for complete search history.

(56) References Cited

U.S. PATENT DOCUMENTS

| | | | | |
|---|---|---|---|---|
| 7,238,418 | B2 * | 7/2007 | Fujita | 428/328 |
| 8,008,371 | B2 * | 8/2011 | Niimi et al. | 523/210 |
| 2004/0028920 | A1 | 2/2004 | Fujita et al. | |
| 2004/0071957 | A1 | 4/2004 | Fujita | |

FOREIGN PATENT DOCUMENTS

| | | |
|---|---|---|
| JP | 2003-327717 | 11/2003 |
| JP | 2004-59875 | 2/2004 |
| JP | 2004-162020 | 6/2004 |
| JP | 2005-47179 | 2/2005 |
| JP | 2006-249345 | 9/2006 |
| JP | 2006-307172 | 11/2006 |
| JP | 2007-519804 | 7/2007 |
| WO | 2007/119742 | 10/2007 |
| WO | 2008/075752 | 6/2008 |

OTHER PUBLICATIONS

Hawley's Condensed Chemical Dictionary, 13th Edition, 1997, pp. 703-704.*

* cited by examiner

*Primary Examiner* — Vickey Nerangis
(74) *Attorney, Agent, or Firm* — Wenderoth, Lind & Ponack, L.L.P.

(57) ABSTRACT

A resin composition for giving molded articles that effectively block heat radiation from sunlight and are excellent in transparency, and molded articles thereof. The resin composition comprises an aromatic polycarbonate resin (Component A), hexaboride particles of at least one element selected from the group consisting of Y, La, Ce, Pr, Nd, Sm, Eu, Gd, Tb, Dy, Ho, Er, Tm, Yb, Lu, Sr and Ca (Component B-1) and other resin different from Component A (Component B-2), wherein the total content of Component B-1 and Component B-2 is 0.001 to 1 part by weight per 100 parts by weight of Component A, the resin composition contains particles (1) composed of Component B-1 and particles (2) composed of Component B-1 and Component B-2, both the particles (1) and (2) having a number average secondary particle diameter of 50 μm or less and a maximum secondary particle diameter of 300 μm or less.

15 Claims, 2 Drawing Sheets

AROMATIC POLYCARBONATE RESIN COMPOSITION AND A MOLDED ARTICLE THEREOF

TECHNICAL FIELD

This invention relates to a resin composition containing an aromatic polycarbonate resin and having the property of blocking heat radiation, and a molded article thereof. Specifically, it relates to a resin composition that gives a molded article excellent in transparency and that effectively blocks heat radiation from sunlight, and a molded article thereof.

BACKGROUND ART

Aromatic polycarbonate resins have excellent transparency, heat resistance and mechanical strength and are widely used in the fields of electric appliances, machinery, automobiles, medical applications, etc. For example, they are used in optical information recording media, optical lenses and building and vehicle glazing materials.

So-called window materials such as building and vehicle glazing materials are required to have the property of blocking heat radiation from sunlight for inhibiting the elevating of temperature in rooms or cars. For the above requirement, there is proposed a resin composition obtained by incorporating hexaboride particles into an aromatic polycarbonate resin.

For example, Patent Document 1 proposes a heat radiation blocking sheet obtained from a dispersion of hexaboride fine particles in an aromatic polycarbonate resin or an acrylic resin. Patent Document 2 proposes a resin sheet obtained from a dispersion of lanthanum boride fine particles having an average particle diameter of 100 nm or less in an aromatic polycarbonate resin. Patent Document 3 proposes a resin composition obtained by incorporating boride fine particles and a low-molecular-weight compound having at least one functional group selected from a hydroxyl group and a carboxyl group into an aromatic polycarbonate resin, and a molded article thereof. Patent Document 4 proposes a resin composition obtained by incorporating boride fine particles into an aromatic polycarbonate resin having a terminal hydroxyl group concentration in the range of 100 to 1,800 ppm and a molded article thereof.

When these resin compositions are produced, generally, a melt extrusion method is employed. Specifically, a master batch containing hexaboride particles and various additives is prepared, and then, the master batch and an aromatic polycarbonate resin are melt-kneaded, to prepare a resin composition. In general, the master batch is prepared by repeating the step of mixing hexaboride particles and various additives with an aromatic polycarbonate resin a plurality of times. However, some methods of preparing the master batch have had a problem that the haze of a resin composition is increased.

(Patent Document 1) JP-A 2003-327717
(Patent Document 2) JP-A 2005-47179
(Patent Document 3) JP-A 2007-519804
(Patent Document 4) JP-A 2006-307172

DISCLOSURE OF THE INVENTION

It is an object of this invention to provide a resin composition that contains an aromatic polycarbonate resin and that gives a molded article excellent in transparency that effectively blocks heat radiation from sunlight, and a molded article thereof. It is another object of this invention to provide a method for producing a resin composition in which hexaboride particles are uniformly dispersed.

The inventors of the present invention have found that by dispersing hexaboride particles in a resin as the dispersing agent, mixing the resultant dispersion with an aromatic polycarbonate resin to prepare a master batch having a predetermined concentration and mixing the master batch with an aromatic polycarbonate resin, hexaboride particles (particles (1)) and particles (particles (2)) composed of a dispersing agent and hexaboride particles are formed in a resin composition, then adjusted in a predetermined particle diameter, thereby obtaining a resin composition providing a molded article having the property of blocking heat radiation and being excellent in transparency, and this invention has been accordingly completed.

That is, this invention includes the following inventions.

1. A resin composition comprising an aromatic polycarbonate resin (Component A), hexaboride particles of at least one element selected from the group consisting of Y, La, Ce, Pr, Nd, Sm, Eu, Gd, Tb, Dy, Ho, Er, Tm, Yb, Lu, Sr and Ca (Component B-1) and other resin different from Component A (Component B-2),
the total content of Component B-1 and Component B-2 being 0.001 to 1 part by weight per 100 parts by weight of Component A,
the resin composition containing particles (1) composed of Component B-1 and particles (2) composed of Component B-1 and Component B-2, both the particles (1) and the particles (2) having a number average secondary particle diameter of 50 μm or less and having a maximum secondary particle diameter of 300 μm or less.

2. A resin composition as recited in the above paragraph 1, which is obtained by mixing Component B-1 and Component B-2 to prepare Component B and then mixing 100 parts by weight of Component A and 0.001 to 1 part by weight of Component B.

3. A resin composition as recited in the above paragraph 1, wherein the hexaboride particles (Component B-1) have coating layers on the surfaces thereof.

4. A resin composition as recited in the above paragraph 3, wherein each of the coating layer of the hexaboride particles (Component B-1) is formed of a pre-coating film composed of a surface modifier formed on the hexaboride particle surface and a coating film mainly composed of an Si oxide formed on the pre-coating film.

5. A resin composition as recited in the above paragraph 1, wherein the hexaboride particles (Component B-1) are hexaboride particles of La.

6. A resin composition as recited in the above paragraph 1, wherein Component B-2 is a resin having a polar functional group and a main chain having an affinity to the aromatic polycarbonate resin (Component A).

7. A resin composition as recited in the above paragraph 1, wherein Component B-2 is an acrylic resin.

8. A resin composition as recited in the above paragraph 1, wherein the content of the hexaboride particles (Component B-1) per 100 parts by weight of the resin (Component B-2) is 1 to 50 parts by weight.

9. A resin composition as recited in the above paragraph 1, which contains 0.1 to 50 parts by weight of nitride particles per 100 parts by weight of the resin (Component B-2).

10. A resin composition as recited in the above paragraph 9, wherein the nitride particles are nitride particles of at least one metal selected from the group consisting of Ti, Zr, Hf, V, Nb and Ta.

11. A resin composition as recited in the above paragraph 1, which contains 0.005 to 5 parts by weight of a thermal stabilizer (Component C) per 100 parts by weight of Component A.

12. A resin composition as recited in the above paragraph 1, which contains 0.005 to 5 parts by weight of a mold release agent (Component D) per 100 parts by weight of Component A.

13. A resin composition as recited in the above paragraph 1, which contains 0.005 to 5 parts by weight of an ultraviolet absorbent (Component E) per 100 parts by weight of Component A.

14. A molded article formed of the resin composition recited in the above paragraph 1.

15. A method of producing the resin composition recited in the above paragraph 1, which comprises the steps of
   (i) mixing Component B-1 and Component B-2 to prepare Component B,
   (ii) mixing Component A and Component B to prepare a master batch, and
   (iii) mixing the master batch with Component A.

16. A method as recited in the above paragraph 15, wherein 100 parts by weight of Component A and 0.1 to 20 parts by weight of Component B are mixed to prepare the master batch.

EXPLANATIONS OF LETTERS AND NOTATIONS

Figure 1:
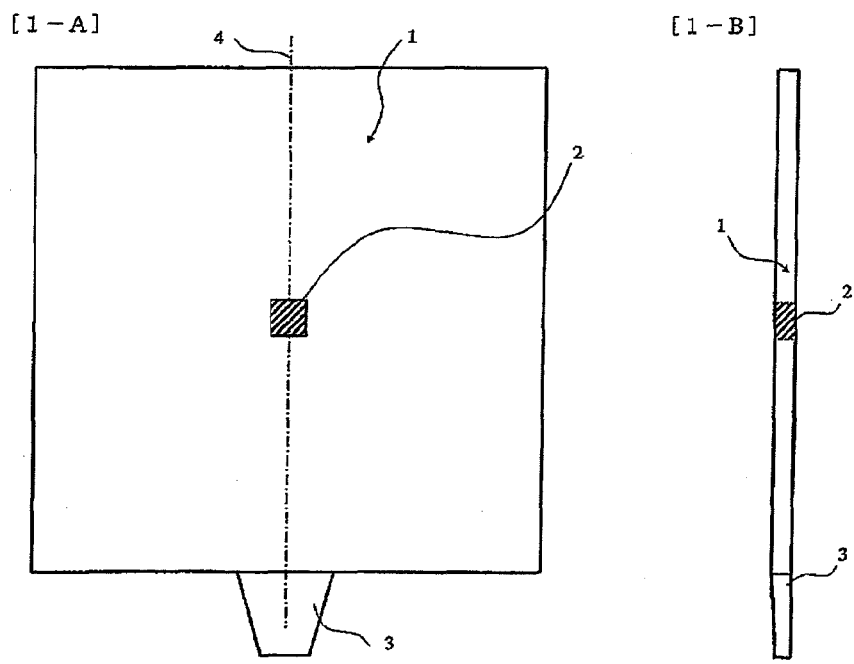
FIG. 1 shows a schematic front view [1-A] of a molded article produced in Example and a schematic side view [1-B] thereof.

| | |
|---|---|
| 1 | Molded article body |
| 2 | Cut-off portion of test piece |
| 3 | Gate portion of molded article |
| 4 | Symmetrical axis |
| 5 | Particles (1) |
| 6 | Particles (2) |

BEST MODE FOR CARRYING OUT THE INVENTION

This invention will be explained with regard to its details hereinafter.

(Component A: Aromatic Polycarbonate Resin)

The aromatic polycarbonate resin for use as Component A in this invention can be obtained by reacting a dihydric phenol with a carbonate precursor. Examples of the reaction method therefor include an interfacial polymerization method, a melt ester exchange method, a solid phase ester exchange method of a carbonate prepolymer, a ring-opening polymerization method of a cyclic carbonate compound, etc.

Typical examples of the above dihydric phenol include hydroquinone, resorcinol, 4,4'-biphenol, 1,1-bis(4-hydroxyphenyl)ethane, 2,2-bis(4-hydroxyphenyl)propane (so-called bisphenol A (to be sometimes abbreviated as "BPA" hereinafter)), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)-cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, bis(4-hydroxy-3-methylphenyl)sulfide, 9,9-bis(4-hydroxyphenyl)fluorene and 9,9-bis(4-hydroxy-3-methylphenyl)fluorene. As the dihydric phenol, bis(4-hydroxyphenyl)alkanes are preferred, and of these, bisphenol A is particularly preferred from the viewpoint of impact resistance.

In this invention, particular kinds of polycarbonates produced from other dihydric phenols can be also used as Component A besides the bisphenol-A-containing polycarbonate that is a general-use aromatic polycarbonate.

For example, aromatic polycarbonates (homopolymers or copolymers) obtained by using, as part or the whole of the dihydric phenol component, 4,4'-(m-phenylenediisopropylidene)diphenol (to be sometimes abbreviated as "BPM" hereinafter), 1,1-bis(4-hydroxyphenyl)cyclohexane, 1,1-bis(4-hydroxyphenyl)-3,3,5-trimethylcyclohexane (to be sometimes abbreviated as "Bis-TMC" hereinafter), 9,9-bis(4-hydroxyphenyl)fluorene and 9,9-bis(4-hydroxy-3-methylphenyl)fluorene (to be sometimes abbreviated as "BCF" hereinafter) are suitable for use in fields where stability against dimensional changes caused by water absorption and form stability are severely required. These dihydric phenols other than BPA are preferably used in an amount of 5 mol % or more, particularly preferably 10 mol % or more, based on the total amount of dihydric phenols for constituting the above polycarbonate. In particular, when high rigidity and higher hydrolysis resistance are required, Component A for constituting the resin composition is particularly suitably any one of the following copolycarbonates (1) to (3).

(1) A copolycarbonate from dihydric phenol components in which, per 100 mol % of the dihydric phenol components for constituting the aromatic polycarbonate, the content of BPM is 20 to 80 mol % (more preferably 40 to 75 mol %, still more preferably 45 to 65 mol %) and the content of BCF is 20 to 80 mol % (more preferably 25 to 60 mol %, still more preferably 35 to 55 mol %).

(2) A copolycarbonate from dihydric phenol components in which, per 100 mol % of the dihydric phenol components for constituting the aromatic polycarbonate, the content of BPA is 10 to 95 mol % (more preferably 50 to 90 mol %, still more preferably 60 to 85 mol %) and the content of BCF is 5 to 90 mol % (more preferably 10 to 50 mol %, still more preferably 15 to 40 mol %).

(3) A copolycarbonate from dihydric phenol components in which, per 100 mol % of the dihydric phenol components for constituting the aromatic polycarbonate, the content of BPM is 20 to 80 mol % (more preferably 40 to 75 mol %, still more preferably 45 to 65 mol %) and the content of Bis-TMC is 20 to 80 mol % (more preferably 25 to 60 mol %, still more preferably 35 to 55 mol %).

These particular kinds of aromatic polycarbonates may be used singly or in combination of at least two of them. Further, these can be used as mixtures with generally used polycarbonates of bisphenol A type. These particular kinds of aromatic polycarbonates are described in detail with regard to their production method and properties, for example, in JP-A 6-172508, JP-A 8-27370, JP-A 2001-55435 and JP-A 2002-117580.

Of the above various aromatic polycarbonates, polycarbonates whose water absorptions and Tg's (glass transition temperatures) are brought into the following ranges by adjusting copolymer compositions are particularly suitable for use in the fields where form stability is required, since such polymers per se are excellent in hydrolysis resistance and remarkably excellent in the property of resisting distortion after molding.

(i) An aromatic polycarbonate having a water absorption of 0.05 to 0.15%, preferably 0.06 to 0.13%, and a Tg of 120 to 180° C., or (ii) an aromatic polycarbonate having a Tg of 160 to 250° C., preferably 170 to 230° C. and a water absorption of 0.10 to 0.30%, preferably 0.13 to 0.30%, more preferably 0.14 to 0.27%.

The above water absorption of an aromatic polycarbonate is a value obtained by using a disk-shaped test piece having a diameter of 45 mm and a thickness of 3.0 mm and measuring it for a water content after it is immersed in water at 23° C. for 24 hours according to ISO62-1980. Further, Tg (glass transition temperature) is a value determined by measurement with a differential scanning calorimeter (DSC) according to JIS K7121.

The carbonate precursor is selected from carbonyl halides, carbonate diesters and haloformates, and specifically includes phosgene, diphenyl carbonate and dihaloformate of dihydric phenol.

When the aromatic polycarbonate resin is produced from the dihydric phenol and the carbonate precursor by an interfacial polymerization method, a catalyst, a terminal stopper and an antioxidant for preventing the oxidation of the dihydric phenol may be used as required.

Further, the aromatic polycarbonate resin includes a branched polycarbonate resin obtained by copolymerizing a trifunctional or higher polyfunctional compound, a polyester carbonate resin obtained by copolymerizing aromatic or aliphatic (including an alicyclic compound) difunctional carboxylic acid, a copolycarbonate resin obtained by copolymerizing a difunctional alcohol (including an alicyclic alcohol), and a polyester carbonate resin obtained by copolymerizing the above difunctional carboxylic acid and difunctional alcohol. Further, it may be a mixture of at least two resins of the thus-obtained aromatic polycarbonate resins.

The branched polycarbonate resin can further synergistically improve the drip-preventing capability that the resin composition of this invention has, so that its use is preferred. The trifunctional or higher polyfunctional aromatic compound used for the above branched polycarbonate resin includes phloroglucin, phloroglucide or trisphenols such as 4,6-dimethyl-2,4,6-tris(4-hydroxyphenyl)heptane-2,2,4,6-trimethyl-2,4,6-tris(4-hydroxyphenyl)heptane, 1,3,5-tris(4-hydroxyphenyl)benzene, 1,1,1-tris(4-hydroxyphenyl)ethane, 1,1,1-tris(3,5-dimethyl-4-hydroxyphenyl)ethane, 2,6-bis(2-hydroxy-5-methylbenzyl)-4-methylphenol and 4-{4-[1,1-bis(4-hydroxyphenyl)ethyl]benzene}-α,α-dimethylbenzylpehnol. It also includes tetra(4-hydroxyphenyl) methane, bis(2,4-dihydroxyphenyl)ketone, 1,4-bis(4,4-dihydroxytriphenylmethyl)benzene, trimellitic acid, pyromellitic acid, benzophenone tetracarboxylic acid and acid chlorides of these. Of these, 1,1,1-tris(4-hydroxyphenyl)ethane and 1,1,1-tris(3,5-dimethyl-4-hydroxyphenyl)ethane are preferred, and 1,1,1-tris(4-hydroxyphenyl)ethane is particularly preferred.

The content of the polyfunctional compound of the branched polycarbonate resin based on the total amount of polycarbonate resins is 0.001 to 1 mol %, preferably 0.005 to 0.9 mol %, more preferably 0.01 to 0.8 mol %, particularly preferably 0.05 to 0.4 mol %. Further, in the melt ester exchange method in particular, a branched structure sometimes occurs as a side reaction, and the content of this branched structure is also preferably in the above range based on the total amount of polycarbonate resins. The content of the above branched structure can be calculated from $^1$H-NMR measurement.

As the aliphatic difunctional carboxylic acid, α,ω-dicarboxylic acids are preferred. Examples of the aliphatic difunctional carboxylic acid preferably include linear saturated aliphatic dicarboxylic acids such as sebacic acid (decanedioic acid), dodecanedioic acid, tetradecanedioic acid, octadecanedioic acid and itacone dioic acid, and aliphatic dicarboxylic acids such as cyclohexanedicarboxylic acid. As the difunctional alcohol, aliphatic diols are preferred. Examples thereof include cyclohexanedimethanol, cyclohexanediol and tricyclodecanedimethanol. Further, there can be also used a polycarbonate-polyorganosiloxane copolymer obtained by copolymerizing a polyorganosiloxane unit.

Reaction types in the interfacial polymerization method, the melt ester exchange method, the solid phase ester exchange method of a carbonate prepolymer and the ring-opening polymerization method of a cyclic carbonate compound, which are methods for producing the aromatic polycarbonate resin, are methods that are well known in various documents and patent publications. Details of a reaction type other than the above are also well known in various documents and patent publications.

The viscosity average molecular weight (M) of the aromatic polycarbonate resin is preferably $1 \times 10^4$ to $5 \times 10^4$, more preferably $1.4 \times 10^4$ to $3 \times 10^4$, still more preferably $1.4 \times 10^4$ to $2.4 \times 10^4$. When the aromatic polycarbonate resin is a resin having a viscosity average molecular weight of less than $1 \times 10^4$, the impact resistance that is expected in practical use is sometimes not obtained, and since no sufficient drip-preventing capability is obtained, a resin composition is liable to be poor in flame retardancy. A resin composition obtained from an aromatic polycarbonate resin having a viscosity average molecular weight of over $5 \times 10^4$ is poor in general use in that it is poor in flowability during injection molding.

Concerning the viscosity average molecular weight, first, a specific viscosity ($\eta_{sp}$) calculated from the following expression is determined from a solution of 0.7 g of a polycarbonate dissolved in 100 ml of methylene chloride at 20° C. with an Ostwald viscometer, Specific viscosity$(\eta_{sp}) = (t - t_0)/t_0$ (wherein $t_0$ is the number of seconds that methylene chloride takes to fall, and t is the number of seconds that a sample solution takes to fall), and a viscosity average molecular weight M is calculated from the determined specific viscosity ($\eta_{sp}$) according to the following expression.

$\eta_{sp}/c = [\eta] + 0.45 \times [\eta]^2 c$ (wherein $[\eta]$ is an intrinsic viscosity)

$[\eta] = 1.23 \times 10^{-3} M^{0.83}$ $c = 0.7$

The method of calculation of a viscosity average molecular weight is applied to measurements of the resin composition and molded article of this invention for viscosity average molecular weights. That is, the viscosity average molecular weights of these in this invention are determined by determining each specific viscosity ($\eta_{sp}$) from solutions of 0.7 g of each molded article dissolved in 100 ml of methylene chloride at 20° C. and inserting each specific viscosity into the above expression.

The form of the aromatic polycarbonate resin is not specially limited, while an aromatic polycarbonate resin powder is preferred for improving the dispersibility of hexaboride particles or nitride particles in the aromatic polycarbonate resin. Further, the particle size distribution of the aromatic polycarbonate resin powder is not specially limited, while the content of a powder having a particle diameter of 710 μm or more in the entire powder is preferably 50% by weight or less, more preferably 40% by weight or less, and the content of a powder having a particle diameter of less than 180 μm in the entire powder is preferably 0 to 40% by weight, more preferably 10 to 30% by weight.

When it is an aromatic polycarbonate resin powder in which the content of a powder having a particle diameter of 710 μm or more in the entire powder is over 50% by weight, the aromatic polycarbonate resin powder is liable to be separated from the hexaboride particles or nitride particles in the process of producing the resin composition of this invention, so that the hexaboride particles or nitride particles in the resin composition are liable to form secondary aggregates. As a result, molded articles obtained from the resin composition of this invention sometimes cannot exhibit high transparency or the capability of absorbing heat radiation which should correspond to the amount of the hexaboride particles or nitride particles added.

Further, when it is an aromatic polycarbonate resin powder in which the content of a powder having a particle diameter of less than 180 μm in the entire powder is over 40% by weight, the mal-mastication of the powder with the screw of a melt-kneading machine is liable to take place during the production of the resin composition of this invention, so that it sometimes causes a decrease in productivity.

With regard to the particle size distribution of the aromatic polycarbonate resin in this invention, first, 200 g of an aromatic polycarbonate resin powder is placed in a JIS standard sieve (22 mesh, openings 710 μm) made of stainless steel, the sieve is closed with a top cover and reciprocated 100 times (distance of one reciprocating motion 40 cm, time for one reciprocating motion 1 second), then, a powder remaining on the above standard sieve is measured for a mass, and the ratio of the mass of the remaining powder to the entire powder is calculated to obtain the content of a powder having a particle diameter of 710 μm or more. Thereafter, the powder passed through the 22 mesh standard sieve is placed in a JIS standard sieve (83 mesh, openings 180 μm) and the sieve is closed with a top cover and reciprocated 100 times, then, a powder remaining on the above standard sieve is measured for a mass, and the ratio of the mass of the remaining powder to the entire powder is calculated to obtain the content of a powder having a particle diameter of 180 to 710 μm. Finally, the powder passed through the 83 mesh standard sieve is measured for a mass, and the ratio of the mass of the powder that has passed to the entire powder is calculated to obtain the content of a powder having a particle diameter of less than 180 μm.

(Component B-1: Hexaboride Particles)

Component B-1 of this invention refers to hexaboride particles of at least one element selected from the group consisting of Y (yttrium), La (lanthanum), Ce (cerium), Pr (praseodymium), Nd (neodymium), Sm (samarium), Eu (europium), Gd (gadolinium), Tb (terbium), Dy (dysprosium), Ho (holmium), Er (erbium), Tm (thulium), Yb (ytterbium), Lu (lutetium), St (strontium) and Ca (Calcium).

The resin composition of this invention contains particles (1) composed of Component B-1. The number average secondary particle diameter of the particles (1) is 50 μm or less, preferably 20 μm or less, more preferably 5 μm or less, most preferably 1 μm or less. Further, the maximum secondary particle diameter of the particles (1) is 300 μm or less, preferably 100 μm or less, more preferably 50 μm or less, most preferably 20 μm or less. When the number average secondary particle diameter is larger than 50 μm or when the maximum secondary particle diameter is larger than 300 μm, the haze increases and the transparency decreases. And, moreover, for example, when products for a vehicle window, etc., are taken into consideration, they are recognized as foreign matter, and sometimes, no products are formed.

The above number average secondary particle diameter and the above maximum secondary particle diameter are measured by the following method. That is, an image observed through a laser microscope or a video microscope is binarization-processed, and a number average secondary particle diameter and a maximum secondary particle diameter are measured with a particle size distribution analyzing software. It is determined that the number of particles to be measured is 1,000 pieces.

Of the elements for constituting the hexaboride particles, La, Ce, Nd and Gd are preferred, La and Ce are more preferred, and La is particularly preferred. The particle diameter of the hexaboride particles is preferably 2 nm to 100 nm, particularly preferably 5 to 90 nm. As the hexaboride particles, for example, KHDS-06 supplied by Sumitomo Metal Mining Co., Ltd., etc., are commercially and easily available.

Desirably, the hexaboride particles (Component B-1) have a coating layer on each surface. The coating layer is desirably composed mainly of a metal oxide. The coating layer is more preferably composed mainly of an oxide of at least metal selected from the group consisting of Si, Ti, Al and Zr. Of these, it is most preferably a coating layer composed mainly of an oxide of Si. The ratio of the oxide of Si to the hexaboride particles as a content of Si contained in a silicic acid compound per part by weight of the hexaboride particles is in the range of 0.01 to 100 parts by weight, more preferably in the range of 0.1 to 10 parts by weight. When the above content of the silicic acid compound is less than 0.01 part by weight, it is difficult to form a secondary coating film, and reversely, when it exceeds 100 parts by weight, particles cause aggregation.

The thickness of the coating film is preferably 1 to 100 nm, more preferably 5 to 90 nm, still more preferably 10 to 80 nm.

The coating layer can be formed by dispersing the hexaboride particles in a solvent, adding and mixing a surface treating agent containing a metal oxide to/with the solvent, and either chemically reacting them to form a coating, or physically forming a coating.

For example, the coating layer composed mainly of Si is formed from a silicon-containing surface treating agent, such as a silazane-containing treating agent, a chlorosilane-containing treating agent, an inorganic treating agent having an alkoxy group in its molecular structure, an organic treating agent having an amino-group-containing alkoxysilane in its molecular terminal or side chain and an organic treating agent having an alkoxy group in its molecular terminal or side chain, both are expected to improve water repellency. The solvent to be used includes water, organic solvents such as an alcohol, and a mixture of water with an organic solvent.

The coating layer is preferably formed of a pre-coating film composed of a surface modifier formed on each surface of the hexaboride particles (Component B-1) and a coating film mainly composed of an oxide of Si on the pre-coating film. That is, preferably, the pre-coating film is beforehand formed on each surface of the hexaboride particles from a surface modifier such as a silane-coupling agent and then the coating film mainly composed of an oxide of Si is formed on the pre-coating film.

The content of Component B-1 per 100 parts by weight of the resin (Component B-2) is preferably 1 to 50 parts by weight, more preferably 5 to 30 parts by weight, still more preferably 7 to 20 parts by weight.

(Component B-2: Resins Other than Component A)

Component B-2 refers to resin(s) other than the aromatic polycarbonate resin (Component A). Component B-2 is preferably a resin having a polar functional group and a main chain having an affinity to the aromatic polycarbonate resin (Component A). Examples of the above functional group include an amino group, a carboxyl group, a sulfonyl group and salts thereof, while it is not specially limited so long as it is a functional group having affinity to the coated hexaboride particles.

Component B-2 includes an acrylic resin, a polyurethane resin, a polyether resin and a polyester resin. Of these, an acrylic resin is particularly preferred. The acrylic resin includes resins obtained by polymerizing methyl methacrylate, butyl methacrylate and cyclohexyl methacrylate by known polymerization methods, and resins obtained by polymerizing monomers such as caprolactone-modified carboxy (meth)acrylate, (meth)acrylic acid, itaconic acid, maleic acid, maleic anhydride, dimethylaminoethyl (meth)acrylate, diethylaminoethyl (meth)acrylate, dimethylaminopropyl (meth)acrylate, diethylaminopropyl (meth)acrylate, 2-hydroxydimethylaminopropyl (meth)acrylate and aminoethyl (meth)acrylate by known polymerization methods. Of these, those which are obtained by polymerizing methyl methacrylate, butyl methacrylate and cyclohexyl methacrylate by known polymerization methods are preferably used.

Examples of Component B-2 include polyacrylate-containing dispersing agents such as trade names SN Thickener A-850 and SN Thickener A-815 supplied by SANNOPKO LIMITED, trade names EFKA 4500 and EFKA 4530 supplied by EFKAADDITIVES B.V., and trade names Disperbyk-116 supplied by BYK-Chemie, polyurethane-containing dispersing agents such as trade names EFKA 4046, EFKA 4047 and EFKA 4520 supplied by EFKAADDITIVES B.V., and trade names TEXAPHORP60, TEXAPHORP63, TEXAPHORP610, etc., supplied by Cognis, polyether-containing dispersing agents such as trade names SN Thickener A-801, SN Thickener A-802, SN Thickener A-803, SN Thickener A-804 and SN Thickener A-806 supplied by SANNOPCO LIMITED and trade names DISPARLON DA-234 and DISPARLON DA-325 supplied by KUSUMOTO CHEMICALS, LTD., and polyester-containing dispersing agents such as trade names Solsperse 22000, Solsperse 24000SC, Solsperse 24000GR, Solsperse 26000, Solsperse 27000, Solsperse 28000, Solsperse 36000, Solsperse 36600 and Solsperse 38500 supplied by Avecia and trade names DISPARLON DA-70350, DISPARLON DA-705, DISPARLON DA-725, DISPARLON DA-860 and DISPARLON DA-873N supplied by KUSUMOTO CHEMICALS, LTD. Of these, the polyacrylate-containing dispersing agents are preferred.

The resin composition of this invention contains particles (2) composed of Component B-1 and Component B-2. The number average secondary particle diameter of the particles (2) is 50 μm or less, preferably 20 μm or less, more preferably 5 μm or less, most preferably 1 μm or less. Further, the maximum secondary particle diameter of the particles (2) is 300 μm or less, preferably 100 μm or less, more preferably 50 μm or less, most preferably 20 μm or less. When the number average secondary particle diameter of the particles (2) is larger than 50 μm, or when the maximum secondary particle diameter is larger than 300 μm, the haze increases and the transparency decreases. Moreover, for example, when products for a vehicle window are taken into consideration, they are recognized as foreign matter, and sometimes, no products are formed.

The above number average secondary particle diameter and the above maximum secondary particle diameter are measured by the same method as that for the particles (1).

Concerning the ratio of the particles (1) and the particles (2) in the resin composition of this invention, the ratio of particles (1)/particles (2) is preferably 3/7 to 7/3, more preferably 4/6 to 6/4.

In the process of melt-kneading Component A and Component B, Component B-1 is separated from Component B thereby coexisting of the particles (1) and the particles (2) in the resin composition of this invention.

(Nitride Particles)

The resin composition of this invention preferably contains 0.1 to 50 parts by weight, per 100 parts by weight of the resin (Component B-2), of nitride particles. The nitride particles are preferably nitride particles of at least one metal selected from the group consisting of Ti, Zr, Hf, V, Nb and Ta.

The total content of Component B-1 and Component B-2 per 100 parts by weight of the aromatic polycarbonate resin (Component A) is 0.001 to 1 part by weight, more preferably 0.01 to 0.5 part by weight, still more preferably 0.05 to 0.3 part by weight.

The resin composition of this invention is preferably a resin composition obtained by mixing Component B-1 and Component B-2 to prepare Component B and then mixing 100 parts by weight of Component A and 0.001 to 1 part by weight of Component B.

(Component C: Thermal Stabilizer)

The resin composition of this invention may contain a thermal stabilizer (Component C). The thermal stabilizer (Component C) is preferably selected from a phosphorus-containing thermal stabilizer or a hindered phenol-containing stabilizer. The phosphorus-containing thermal stabilizer includes phosphorous acid, phosphoric acid, phosphonous acid, phosphonic acid and esters of these.

Specific examples of the above esters include the following compounds. As phosphite compounds, there are included triphenyl phosphite, tris(nonylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, tris(2,4-di-tert-butylphenyl) phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite.

As phosphate compounds, there are included tributyl phosphate, triethyl phosphate, trimethyl phosphate, triphenyl phosphate, diphenyl mono-ortho-xenyl phosphate, dibutyl phosphate, dioctyl phosphate, diisopropyl phosphate.

As phosphonite compounds, there are included tetrakis(2,4-di-iso-propylphenyl)=4,4'-biphenylene diphosphonite, tetrakis(2,4-di-n-butylphenyl)-4,4'-biphenylene diphosphonite, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-iso-propylphenyl)-4,4'-biphenylene diphosphonite, tetrakis(2,6-di-n-butylphenyl)-4,4'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-phenyl-phenyl phosphonite.

As phosphonate compounds, there are included dimethyl benzenephosphonate, diethyl benzenephosphonate, dipropyl benzenephosphonate.

Of these, tris(2,4-di-tert-butylphenyl) phosphite, tetrakis (2,4-di-tert-butylphenyl)-4,4'-biphenylene diphosphonite and bis(2,4-di-tert-butylphenyl)-phenyl-phenyl phosphonite are preferred.

Further, examples of the hindered phenol-containing stabilizer include octadecyl-3-(3,5-di-tert-butyl-4-hydroxyphenyl)propionate, pentaerythrityl tetrakis[3-(3,5-di-tert-butyl-4-hydroxyphenyl)propionate], 2,6-di-tert-butyl-p-cresol, 4,4'-butylidenebis-(6-tert-butyl-3-methylphenol, 1,1,3-tris (2-methyl-4-hydroxy-5-tert-butylphenyl)methane, 2,2-thiodiethylenebis-[3-(3,5-di-tert-butyl-4-hydroxyphenyl) propionate], octadecyl-3-(3,5-di-tert-butyl-4-hydroxyphenyl)propionate, N,N'-hexamethylenebis-(3,5-di-tert-butyl-4-hydrocinnamide), 3,5-di-tert-butyl-4-hydroxybenzylphosphonate-diethyl ester, 1,3,5-trimethyl-2,4,6-tris (3,5-di-tert-butyl-4-hydroxybenzyl)benzene, 1,6-hexanediolbis[3-(3,5-di-tert-butyl-4-hydroxyphenyl) propionate], tris(3,5-di-tert-butyl-4-hydroxybenzyl) isocyanurate and 2,4-bis(n-octylthio-6-(4-hydroxy-3,5-di-tert-butylanilino)-1,3,5-triazine. These thermal stabilizers may be used singly or as a mixture of two or more of them.

The content of the thermal stabilizer (Component C) per 100 parts by weight of the aromatic polycarbonate resin (Component A) is preferably 0.005 to 5 parts by weight, more preferably 0.008 to 2 parts by weight, still more preferably 0.01 to 0.5 part by weight.

(Component D: Mold Release Agent)

The resin composition of this invention may contain a mold release agent (Component D). The mold release agent (Component D) can be selected from those which are known. Examples thereof include a saturated fatty acid ester, unsaturated fatty acid esters, polyolefin waxes (such as polyethylene wax and 1-alkene polymer, and those which are modified with a compound having a functional group, such as an acid, can be also used), silicone compounds, fluorine compounds (fluorine oils typified by polyfluoroalkyl ether), paraffin wax and beeswax. In addition, Component D has the property of being a plasticizer, and when added to the resin composition of this invention, Component D produces an effect that Component B is improved in dispersibility. The content of the mold release agent (Component D) per 100 parts by weight of the aromatic polycarbonate resin (Component A) is preferably 0.005 to 5 parts by weight, more preferably 0.008 to 2 parts by weight, still more preferably 0.01 to 0.5 part by weight, most preferably 0.08 to 0.5 part by weight.

(Component E: Ultraviolet Absorbent)

The resin composition of this invention may contain an ultraviolet absorbent (Component E). Examples of the ultraviolet absorbent (Component E) include known benzophenone-containing compounds, benzotriazole-containing compounds, hydroxyphenyl triazine-containing compounds, a cyclic iminoester-containing compounds and cyanoacrylate-containing compounds.

As a suitable example, the benzotriazole-containing compounds include 2-(2H-benzotriazol-2-yl)-p-cresol, 2-(2H-benzotriazol-2-yl)-4-(1,1,3,3-tetramethylbutyl)phenol, 2-(2H-benzotriazol-2-yl)-4,6-bis(1-methyl-1-phenylethyl) phenol, 2-[5-chloro(2H)-benzotriazol-2-yl]-4-methyl-6-tert-butylphenol and 2,2'-methylenebis[6-(2H-benzotriazol-2-yl)-4-(1,1,3,3-tetramethylbutyl)phenol].

As a suitable example of the hydroxyphenyltriazine-containing compounds, there is included 2-(4,6-diphenyl-1,3,5-triazin-2-yl)-5-[(hexyl)oxy]phenol.

As a suitable example of the cyclic iminoester-containing compounds, there is included 2,2'-p-phenylenebis(3,1-benzooxazin-4-one).

As a suitable example of the cyanoacrylate-containing compounds, there is included 1,3-bis[(2-cyano-3,3-diphenylacryloyl) oxy]-2,2-bis[[2-cyano-3,3-diphenylacryloyl)oxy] methyl]propane.

Further, the ultraviolet absorbent may have the structure of a radical polymerizable monomer compound and form a polymer type ultraviolet absorbent obtained by copolymerization of such an ultraviolet-absorption-capable monomer and a monomer such as an alkyl (meth)acrylate. As a suitable example, the ultraviolet-absorption-capable monomer includes a compound having a benzotriazole structure, a benzophenone structure, a triazine structure, a cyclic iminoester structure or a cyanoacrylate structure in the ester substituent of a (meth)acrylate ester.

Of the above compounds, a cyclic iminoester-containing compound is employed as a more suitable ultraviolet absorbent in that it has excellent thermal stability. The other compounds also have excellent heat resistance when they have relatively high molecular weights, and as a suitable example, there are included 2,2'-methylenebis[6-(2H-benzotriazol-2-yl)-4-(1,1,3,3-tetramethylbutyl)phenol], 2-(4,6-diphenyl-1,3,5-triazin-2-yl)-5-[(hexyl)oxy]phenol, and 1,3-bis[(2-cyano-3,3-diphenylacryloyl)oxy]-2,2-bis[[(2-cyano-3,3-diphenylacryloyl)oxy]methyl]propane.

The content of the ultraviolet absorbent (Component E) per 100 parts by weight of the aromatic polycarbonate resin (Component A) is preferably 0.005 to 5 parts by weight, more preferably 0.01 to 3 parts by weight, still more preferably 0.05 to 0.5 part by weight.

(Other Additives)

The resin composition of this invention may contain conventionally known various additives as required. Examples of these additives include an antioxidant, a light stabilizer, a colorant, a lubricant, a light scattering agent, a fluorescent brightener, an antistatic agent, a flame retardant, a flame retardant aid, a plasticizer, a reinforcement filler, an impact modifier, a photocatalytic stain-proofing agent, a photochromic agent, etc.

(Antioxidant)

As a suitable example, the antioxidant includes hindered phenol compounds. For example, tetrakis[methylene-3-(3-tert-butyl-4-hydroxy-5-methylphenyl)propinonate]methane, octadecyl-3-(3,5-di-tert-butyl-4-hydroxylphenyl)propinonate, and 3,9-bis[2-{3-(3-tert-butyl-4-hydroxy-5-methylphenyl)propyloxy}-1,1-dimethylethyl]-2,4,8-10-tetraoxyspiro [5,5]undecane are preferably used. The content of the antioxidant per 100 parts by weight of the aromatic polycarbonate resin (Component A) is preferably 0.005 to 5 parts by weight, more preferably 0.01 to 1 part by weight.

(Light Stabilizer)

The light stabilizer includes hindered amine-containing light stabilizers typified by bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, poly{[6-(1,1,3,3-tetramethylbutyl)amino-1,3,5-triazine-2,4-dinyl][(2,2,6,6-tetramethylpiperidyl)imino]hexamethylene[(2,2,6,6-tetramethylpiperidyl)imino]}, and polymethylpropyl-3-oxy-[4-(2,2,6,6-tetramethyl)piperidinyl]siloxane.

The content of the light stabilizer per 100 parts by weight of the aromatic polycarbonate resin (Component A) is preferably 0.01 to 5 parts by weight, more preferably 0.05 to 1 part by weight.

(Colorant)

The resin composition of this invention may contain a colorant as required, while the colorant is not specially limited so long as it has coloring capability. The colorant as a dye includes perylene dyes, coumarin dyes, thioindigo dyes, anthraquinone dyes, thioxanthone dyes, ferrocyanide dyes such as iron blue, perinone dyes, quinoline dyes, quinacridone dyes, dioxazine dyes, isoindolinone dyes and phthalocyanine dyes. As a pigment, it includes carbon black, titanium oxide, copper phthalocyanine, barium sulfate and further fluorescent brighteners such as a bisbenzooxazolyl-stilbene derivative, a bisbenzooxazolyl-naphthalene derivative, bisbenzooxazolyl-thiophene derivative and a coumarin derivative. The content of the above dye or fluorescent brightener per 100 parts by weight of the aromatic polycarbonate resin is preferably 0.0001 to 1 part by weight, more preferably 0.0005 to 0.5 part by weight.

(Production of Resin Composition)

The resin composition of this invention can be produced by the steps (i), (ii) and (iii).

(Step (i))

The step (i) is a step in which the hexaboride particles (Component B-1) and the resin other than Component A (Component B-2) are mixed to prepare Component B. The amount of Component B-1 for use per 100 parts by weight of Component B-2 is preferably 1 to 50 parts by weight, more preferably 5 to 30 parts by weight, still more preferably 7 to 20 parts by weight. Component B is preferably prepared by mixing and dispersing Component B-1 and Component B-2 in a solvent and drying the dispersion to volatilize the solvent.

(Step (ii))

The step (ii) is a step in which the aromatic polycarbonate resin (Component A) and Component B are mixed to prepare a master batch.

The amount of Component B per 100 parts by weight of Component A is preferably 0.1 to 20 parts by weight, more preferably 1 to 12 parts by weight, still more preferably 3 to 12 parts by weight. When the amount of Component B in the master batch is brought into the above range, the particles (1) and the particles (2) in the step (iii) are improved in dispersibility, and in the resin composition of this invention to be obtained, it is ensured that the number average secondary particle diameter of the particles (1) and the particles (2) is 50 μm or less and that the maximum secondary particle diameter thereof is 300 μm or less.

When they are mixed, preferably, they are pre-mixed with a twin-shell blender, a Henschel mixer, a mechanochemical apparatus, an extrusion mixer, or the like, then melt-kneaded with an extruder typified by a vented twin-screw extruder and pelletized with an apparatus such as a pelletizer. After the pre-mixing, the mixture may be granulated with an extrusion granulator or briquetting machine.

As an extruder, there is preferably used an extruder having a vent capable of exhausting water in raw materials and volatilization gas that is generated from a molten kneaded resin. Preferably, a vacuum pump is provided for effectively exhausting generated water and volatilization gas out of the extruder through the vent.

Further, a screen for removing foreign matter included in extrusion raw materials may be arranged in a zone before the die portion of the extruder, whereby the foreign matter can be removed from the resin composition. The above screen includes a metal gauge, a screen changer, a sintered metal plate (such as disk filter), and the like.

As an extruder, there can be used a Banbury mixer, a kneading roll, a single-screw extruder, a multiple screw extruder equipped with three or more screws besides a twin-screw extruder.

The thus-extruded resin is either pelletized by directing cutting it or pelletized by forming strands and then cutting the strands with a pelletizer. When it is required to decrease the influence caused by external dust in the pelletizing, preferably, the atmosphere around the extruder should be cleaned. The thus-obtained pellets may take the general form such as cylindrical, prismatic, and spherical while the form of a cylinder is preferred. The diameter of the above cylinder is preferably 1 to 5 mm, more preferably 1.5 to 4 mm, still more preferably 2 to 3.3 mm. The length of the cylinder is preferably 1 to 30 mm, more preferably 2 to 5 mm, still more preferably 2.5 to 3.5 mm.

The above-obtained master batch may be mixed with Component A to prepare a secondary master batch. The amount of Component A based on the master batch is preferably 1 to 100 parts by weight, more preferably 10 to 50 parts by weight. Further, the thus-obtained secondary master batch may be further mixed with Component A to prepare a tertiary master batch. The amount of Component A based on the master batch is preferably 1 to 100 parts by weight, more preferably 10 to 50 parts by weight. Further, a master batch of over the tertiary may be prepared.

(Step (iii))

The step (iii) is a step in which the master batch obtained in the step (ii) is mixed with Component A to obtain a resin composition. The mixing can be carried out by the same method as that in the step (ii).

(Molded Article)

The molded article of this invention can be obtained by injection-molding pellets formed of the resin composition of this invention.

The injection molding not only includes a general molding method but also includes injection compression molding, injection press molding, gas-assisted injection molding, expansion molding (including a method in which a supercritical fluid is injected), insert molding, in-mold coating, insulated runner molding, quick heating cooling molding, two-color part molding, sandwich molding, laminate molding or ultra-high speed injection molding. For the molding, further, any one of a cold runner method and a hot runner method can be selected.

According to this invention, further, the resin composition can be extrusion-molded to obtain a molded article having an irregular shape, a sheet, or a film. For molding into the form of a sheet or film, an inflation method, a calender method or a casting method, can be also employed. Further, it can be molded into a heat-shrinkable tube by applying a specific drawing operation. Further, the resin composition of this invention can be also shaped into molded articles by rotational molding or blow molding. For these molding processes, for example, JP-A 2005-179504 describes them in detail.

In addition, preferably, the molded article of this invention has a thickness of 2 to 50 mm, preferably 4 to 30 mm, and a maximum projection area of 400 to 23,000 $cm^2$, preferably 600 to 18,000 $cm^2$. The molded article can be used as a window in a living space or a vehicle.

(Lamination on Molded Article)

The molded article of this invention can be provided with various functional layers including a hard coating layer on its surface. Above all, it is preferred to form a hard coating layer for improving the molded article surface in scratch resistance and weatherability. Examples of the other functional layer include a pattern layer, an electrically conductive layer (heat-generation layer, electromagnetic wave absorption layer, antistatic layer), a water-repellent/oil-repellent layer, a hydrophilic layer, an ultraviolet absorption layer, an infrared absorption layer, a cracking prevention layer or a metal layer (metalized layer). The above functional layer can be formed on the surface of a hard coating layer, on the other surface of the molded article opposed to the hard coating layer, between molded article layers when a plurality of molded article layers are provided, partly between a primer layer and a molded article surface or partly between a primer layer and a hard coating top layer.

The pattern layer is generally formed by printing. The printing method can be selected from conventionally known printing methods such as gravure printing, surface (planographic) printing, flexographic printing, dry offset printing, Pat Printing and screen printing, depending upon the form of a product and the use of a print.

The method for forming the above hard coating layer and properties thereof are described in detail, for example, in JP-A 2005-179504 and JP-A 2006-255928.

As a constitution of a printing ink for the printing, there can be used an ink composed mainly of a resin or an oil. The resin-based ink can be selected from natural resins such as rosin, Gilsonite, ceramic and copal, and synthetic resins such as phenols and derivatives thereof, an amino-containing resins, a butylated urea, a melamine resin, a polyester-containing alkyd resin, a styrene resin, an acrylic resin, a phenolic resin, an epoxy resin, a polyamide resin, an aromatic polycarbonate resin, a saturated polyester resin, a non-crystalline polyallylate resin, a non-crystalline polyolefin resin, a vinyl chloride resin, a vinyl acetate resin, a vinyl chloride-vinyl acetate copolymer, a butyral resin, a methyl cellulose resin, an ethyl cellulose resin and a urethane resin. When an ink component having high heat resistance is required, it is preferred to employ printing inks using an aromatic polycarbonate resin or a non-crystalline polyallylate resin, as binders. The printing ink can be adjusted to a desired color by incorporating a pigment or dye.

Embodiments of this invention which the present inventor considers the best are embodiments that integrate the preferred ranges of the above essential requirements. Typical examples thereof will be described in the following Examples, while the present invention shall not be limited to these embodiments.

EXAMPLES

This invention will be explained in detail with reference to Examples hereinafter, while obtained molded products were evaluated according to the following methods.
(1) HAZE
A test piece having a thickness of 18 mm, a length of 55 mm and a width of 55 mm was measured for a haze (%) with HR-100 supplied by Murakami Color Research Laboratory Co., Ltd.
(2) Solar Radiation Heat Acquisition Ratio
A test piece having a thickness of 18 mm, a length of 55 mm and a width of 55 mm was measured for a solar radiation heat acquisition ratio at a wavelength of 300 to 2,100 nm with a spectrophotometer (U-4100, supplied by Hitachi High-Technologies Corporation) according to JIS R3106 (1998) "Methods of testing sheet glasses for transmittance, reflectivity, emissivity and solar radiation heat acquisition ratio".
(3) Particle Diameter
A test piece having a thickness of 18 mm, a length of 55 mm and a width of 55 mm was observed with a laser microscope (VK9700, supplied by Keyence Corporation) and measured for a number average secondary particle diameter and a maximum secondary particle diameter. The number of particles to be measured was determined to be 1,000 pieces.

(4) Appearance Evaluation
A surface of test piece having a thickness of 18 mm, a length of 55 mm and a width of 55 mm was visually observed and evaluated on the basis of the following ratings.
○: Excellent since no foreign matter was observed on a surface.
X: Foreign matter was observed on a surface.
(5) Ratio of Particles (1) and Particles (2) in Test Piece
A test piece for observation was prepared by slicing in a thickness of 50 to 100 nm with an ultra-microtome. The test piece was observed by EF-TEM photography (energy filtering transmission electron microscope) (magnification: 25,000), and the numbers of particles (1) formed of Component B-1 alone and particles (2) formed of Component B-1 and Component B-2 were measured.

Example 1

(I) Production of Pellets

Pellets were produced according to the following steps (i) to (iii).
(Step (i): Preparation of Particles-Containing Resin (Component B))
(Preparation of Coated Lanthanum Hexaboride Particles (Component B-1))
8 Parts by weight of lanthanum hexaboride particles having an average particle diameter of 80 nm (KHDS-06: supplied by Sumitomo Metal Mining Co., Ltd.) were mixed with 0.5 part by weight of γ-aminopropyltriethoxysilane as a silane coupling agent and 392 parts by weight of water with stirring, to cause lanthanum hexaboride particle surfaces to adsorb γ-aminopropyltriethoxysilane for surface modification.

Then, water was removed with a centrifugal separator, and then 45 parts by weight of tetraethoxysilane was added to a solvent mixture containing the surface-modified lanthanum hexaboride particles, 280 parts by weight of ethanol and 70 parts by weight of water, to form a silica coating film on each of the lanthanum hexaboride particle surfaces by hydrolysis polymerization. Thereafter, alcohol and water were removed with a centrifugal separator, and the remainder was dried and further heat-treated at 450° C. for 30 minutes to give coated lanthanum hexaboride particles. In the coated lanthanum hexaboride particles, the weight ratio of (a) lanthanum hexaboride and (b) coating layer, (a)/(b), was 40/60.
(Mixing of Coated Lanthanum Hexaboride Particles (Component B-1) with Resin (Component B-2))
20 Parts by weight of the above-obtained coated lanthanum hexaboride particles (Component B-1), 75 parts by weight of toluene and 5 parts by weight of an acrylic resin dispersing agent (Component B-2, EFKA-4530: supplied by EFKA additives) were mixed, and the mixture was subjected to dispersing treatment to obtain a coated lanthanum hexaboride particle dispersion (liquid (i)).
(Preparation of Dispersion of Titanium Nitride Particles)
For adjusting a color tone, 20 parts by weight of titanium nitride particles having an average particle diameter of 80 nm (supplied by Sumitomo Metal Mining Co., Ltd.), 75 parts by weight of toluene and 5 parts by weight of an acrylic resin dispersing agent (Component B-2, EFKA-4530: supplied by EFKA Additives) were mixed and the mixture was subjected to dispersing treatment to give a dispersion of titanium nitride particles (liquid (ii)).

Then, the liquid (i) and the liquid (ii) were mixed so as to ensure that the weight ratio of lanthanum hexaboride in the coated lanthanum hexaboride particles and the titanium nitride particles became 8:2 (the weight ratio of the coated lanthanum hexaboride particles and the titanium nitride particles became 95:5). Then, toluene was removed with a centrifugal separator, followed by drying, to give a particles-containing resin (Component B).

(Step (ii): Preparation of Master Batch)

0.28 Part by weight of PC (Component A) and 0.01 part by weight of the particles-containing resin (Component B) were uniformly mixed with a super floater, to give 0.29 part by weight of a master batch.

(Step (ii-1): Preparation of Secondary Master Batch)

Then, 0.29 part by weight of the master batch, 4.26 parts by weight of PC (Component A), 0.02 part by weight of S100A, 0.03 part by weight of PEPQ, 0.10 part by weight of VPG and 0.30 part by weight of UV1577 were uniformly mixed with a tumbler to give 5 part by weight of a secondary master batch that was to be fed to an extruder.

(Step (iii))

5 Parts by weight of the thus-obtained secondary master batch and 95 parts by weight of PC (Component. A) were fed to an extruder. The extruder used was a vented twin-screw extruder having a screw diameter of 77 mmφ (TEX77CHT (complete interlock, unidirectional rotation, double screws; supplied by Japan Steel Works, Ltd.). The above extruder had a kneading zone having a combination of a forward-feeding kneading disk and a backward-feeding kneading disk at a portion of approximately 8 to 11 of L/D viewed from a screw root, and also had another kneading zone having a forward-feeding kneading disk at a portion of approximately 16 to 17 of L/D. Further, the extruder had a backward-feeding full-flight zone having a length of 0.5 of L/D immediately after the rear kneading zone. One vent port was provided in a portion of approximately 18.5 to 20 of L/D. As extrusion conditions, there were employed a discharge amount of 320 kg/h, a screw rotation speed of 160 rpm and a vent vacuum degree of 3 kPa. Further, as an extrusion temperature, there was employed a temperature setting in which the temperature was gradually increased from a 230° C. at a first supply port to 280° C. at a die portion.

Strands extruded from the die were cooled in hot water and pelletized by cutting them with a pelletizer. Pellets immediately after the cutting passed a vibrating sieve for approximately 10 seconds to remove insufficiently cut long pellets and cut scraps that were removable.

(II) Production of Test Piece of Resin Plate Molded Article

Pellets produced by the method in the above (I) were injection press-molded with a large molding machine that had a four axis parallel control mechanism of a platen and that was capable of injection press-molding (MDIP2100: supplied by MEIKI Co., Ltd., maximum clamping force 33540 kN) to produce a molded article having a thickness of 18 mm, a length of 700 mm and a width of 800 mm as shown in FIG. 1. The molding machine was equipped with a hopper dryer capable of fully drying a resin raw material, and the dried pellets were supplied to a molding machine supply port by an air-pressure transport and used for the molding.

For the molding, there were employed a cylinder temperature of 275° C., a hot runner set temperature of 275° C., a fixed mold temperature of 115° C., a movable mold temperature of 120° C., a press stroke of 0.5 mm, a mold moving speed of 0.02 mm/second from an intermediate clamping state to a final clamping state and a pressure holding time period of 600 seconds. A pressure during compression was set at 25 MPa, and this pressure was maintained for the pressure holding time period. An injection speed was set at 5 mm/second in a region until a gate portion was charged with resin and at 16 mm/second in a region thereafter. Further, it was arranged that the parting surface of the movable mold should not come in contact with the parting surface of the fixed mold in a final forward position. As a runner, a valve gate type hot runner (diameter 8 mmφ) supplied by HOTSYS was used. Immediately before the charging was completed, mold compression was started, and an overlap was set for 0.5 second. There were employed conditions in which no molten resin flowed back from the gate to the cylinder when the valve gate was closed immediately after the charging was completed. In the above molding, tan θ, which represents an inclination amount and a torsion amount, was maintained at approximately 0.000025 or less owing to the four axis parallel control mechanism.

The thus-obtained molded article was taken out and left for 60 minutes to fully cool it. The molded article had a green color having high transparency. Then, a central portion of the molded article shown by slanting lines in FIG. 1 was cut out so as to have a length of 55 mm and a width of 55 mm to give a test piece.

Figure 2:
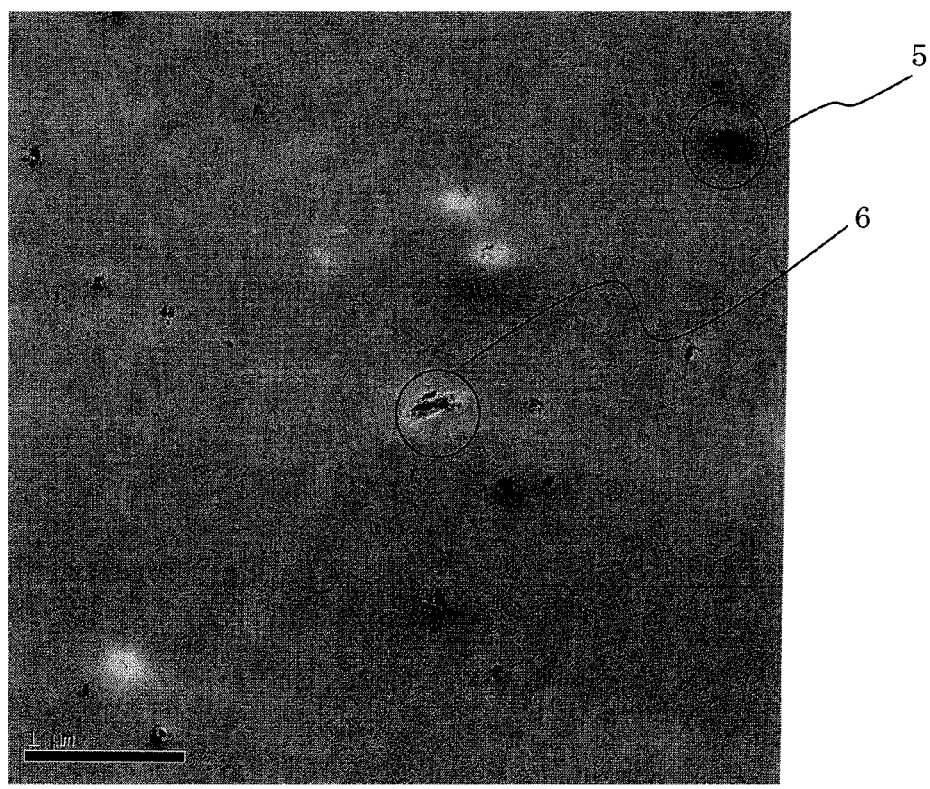
FIG. 2 is an EF-TEM photograph of a test piece obtained in Example 1.

Test pieces obtained by the method in the above (II) were evaluated and Table 1 shows the evaluation results. FIG. 2 shows an EF-TEM photograph (energy filtering transmission electron microscope, magnification: 25,000) of the test piece. In FIG. 2, a white portion indicates a resin (Component B-2), and black spots indicate coated lanthanum hexaboride particles (Component B-1). It is seen that there are particles (1) formed of Component B-1 alone and particles (2) formed of Component B-1 and Component B-2.

Example 2

In the step (ii), 0.09 part by weight of PC (Component A) and 0.01 part by weight of the particles-containing resin (Component B) were uniformly mixed with a super floater to prepare 0.1 part by weight of a master batch.

In the step (ii-1), further, 0.1 part by weight of the master batch, 4.45 parts by weight of PC (Component A), 0.02 part by weight of S100A, 0.03 part by weight of PEPQ, 0.10 part by weight of VPG and 0.30 part by weight of UV1577 were uniformly mixed with a tumbler to give 5 parts by weight of a secondary master batch to be fed to an extruder.

Pellets were produced in the same manner as in Example 1 except for the above steps. Then, molding was carried out in the same manner as in Example 1 to make test pieces. Table 1 shows evaluation results of the thus-obtained test pieces.

Comparative Example 1

In the step (ii), 0.04 part by weight of PC (Component A) and 0.01 part by weight of the particles-containing resin (Component B) were uniformly mixed with a super floater to prepare a master batch.

In the step (ii-1), 0.05 part by weight of the master batch and 0.23 part by weight of PC (Component A) were uniformly mixed with a V-blender to prepare 0.28 part by weight of a secondary master batch.

Pellets were produced in the same manner as in Example 1 except that 0.28 part by weight of the secondary master batch, 4.27 parts by weight of PC, 0.02 part by weight of S100A, 0.03 part by weight of PEPQ, 0.10 part by weight of VPG and 0.30 part by weight of UV1577 were uniformly mixed with a tumbler to obtain 5 parts by weight of a tertiary master batch to be fed to an extruder. Then, molding was carried out in the same manner as in Example 1 to make test pieces. Table 1 shows evaluation results of the thus-obtained test pieces.

Comparative Example 2

In the step (ii), 0.28 part by weight of PC (Component A) alone was uniformly mixed with a super floater to prepare 0.29 part by weight of a master batch.

Then, 0.29 part by weight of the master batch, 4.55 parts by weight of PC (Component A), 0.02 part by weight of S100A, 0.03 part by weight of PEPQ, 0.10 part by weight of VPG and 0.30 part by weight of UV1577 were uniformly mixed with a tumbler, to prepare a secondary master batch.

Pellets were produced in the same manner as in Example 1 except for the above steps. Then, molding was carried out in the same manner as in Example 1 to make test pieces in the form of a resin plate each. Table 1 shows evaluation results of the thus-obtained test pieces.

Comparative Example 3

In the step (ii), 41 parts by weight of PC and 1.5 parts by weight of the particles-containing resin (Component B) were uniformly mixed with a super floater to prepare 42.5 parts by weight of a master batch.

Then, 42.5 parts by weight of the master batch, 7.05 parts by weight of PC, 0.02 part by weight of S100A, 0.03 part by weight of PEPQ, 0.10 part by weight of VPG and 0.30 part by weight of UV1577 were uniformly mixed with a tumbler, to prepare 50 parts by weight of a secondary master batch.

Pellets were produced in the same manner as in Example 1 except for the above steps. Then, molding was carried out in the same manner as in Example 1 to make test pieces. Table 1 shows evaluation results of the thus-obtained test pieces.

The above components described by symbols are as follows.

PC: Aromatic polycarbonate resin powder having a viscosity average molecular weight of 23,700, obtained from bisphenol A and phosgene by an interfacial polycondensation method (Panlite L-1250 WP (trade name), supplied by Teijin Chemicals Ltd.)

S100A: Partial ester of stearic acid and glycerin (Rikemal S-100A: supplied by Riken Vitamin Co., Ltd.)

VPG: Full ester of pentaerythritol and aliphatic carboxylic acid (composed of stearic acid and palmitic acid as main component) (LOXIOL VPG861: supplied by Cognis Japan Ltd.)

PEPQ: Phosphonite thermal stabilizer (Sandstab P-EPQ: supplied by Sandoz)

UV1577: 2-(4,6-diphenyl-1,3,5-triazin-2-yl)-5-[(hexyl)oxy]phenol (Tinuvin 1577: supplied by Ciba Specialty Chemicals)

EFFECT OF THE INVENTION

Owing to the uniform dispersion of hexaboride particles therein, a resin composition of this invention effectively blocks heat radiation from sunlight and has excellent transparency. The molded article of this invention is excellent in the property of blocking heat radiation and transparency. According to the process for producing a resin composition provided by this invention, there can be produced a resin composition that has hexaboride particles uniformly dispersed therein and that is excellent in the blocking property and transparency.

INDUSTRIAL APPLICABILITY

The molded article of this invention can be used as a window in a living space or a vehicle.

The invention claimed is:

1. A resin composition comprising an aromatic polycarbonate resin (Component A), hexaboride particles of at least one element selected from the group consisting of Y, La, Ce, Pr, Nd, Sm, Eu, Gd, Tb, Dy, Ho, Er, Tm, Yb, Lu, Sr and Ca (Component B-1), an other resin different from Component A (Component B-2) and nitride particles (3),
    wherein,
    a total content of Component B-1 and Component B-2 is 0.001 to 1 part by weight per 100 parts by weight of Component A,
    the resin composition contains particles (1) composed of Component B-1 and particles (2) composed of Component B-1 and Component B-2, both the particles (1) and the particles (2) have a number average secondary particle diameter of 50 μm or less and a maximum secondary particle diameter of 300 μm or less, and
    a content of the nitride particles (3) is 0.1 to 50 parts by weight per 100 parts by weight of the other resin (Component B-2).

2. The resin composition of claim 1, which is obtained by mixing Component B-1 and Component B-2 to prepare Component B and then mixing 100 parts by weight of Component A and 0.001 to 1 part by weight of Component B.

3. The resin composition of claim 1, wherein the hexaboride particles (Component B-1) have coating layers on a surface thereof.

TABLE 1

| Classification | Components | Particulars | Ex. 1 | Ex. 2 | CEx. 1 | CEx. 2 | CEx. 3 |
|---|---|---|---|---|---|---|---|
| Composition | Component A | PC | 100 | 100 | 100 | 100 | 100 |
| | Component B | Particles-containing resin | 0.01 | 0.01 | 0.01 | 0 | 1.5 |
| | Component C | PEPQ | 0.03 | 0.03 | 0.03 | 0.03 | 0.03 |
| | Component D | VPG | 0.1 | 0.1 | 0.1 | 0.1 | 0.1 |
| | | S-100A | 0.02 | 0.02 | 0.02 | 0.02 | 0.02 |
| | Component E | UV1577 | 0.3 | 0.3 | 0.3 | 0.3 | 0.3 |
| Extrusion | Master batch concentration (%) | | 3.45 | 10 | 20 | — | 3.53 |
| Evaluation results | HAZE (%) | | 0.9 | 1.8 | 3.4 | 0.2 | 5.5 |
| | Solar radiation heat acquisition ratio (%) | | 0.47 | 0.49 | 0.50 | 0.77 | 0.52 |
| | Evaluation of appearance | | ○ | ○ | X | ○ | X |
| | Particles (1) | Number average secondary particle diameter (μm) | 0.08 | 37 | 53 | — | 62 |
| | | Maximum secondary particle diameter (μm) | 0.13 | 195 | 245 | — | 320 |
| | Particles (2) | Number average secondary particle diameter (μm) | 0.16 | 42 | 62 | — | 78 |
| | | Maximum secondary particle diameter (μm) | 0.25 | 260 | 280 | — | 380 |
| | Particles (1)/(2) | | 1.5 | 1.1 | 0.7 | — | 0.5 |

4. The resin composition of claim 3, wherein each of the coating layers on the hexaboride particles (Component B-1) is formed of a pre-coating film composed of a surface modifier formed on the surface of the hexaboride particles and a coating film mainly composed of an Si oxide formed on the pre-coating film.

5. The resin composition of claim 1, wherein the hexaboride particles (Component B-1) are hexaboride particles of La.

6. The resin composition of claim 1, wherein Component B-2 is a resin having a polar functional group and a main chain having an affinity to the aromatic polycarbonate resin (Component A).

7. The resin composition of claim 1, wherein Component B-2 is an acrylic resin.

8. The resin composition of claim 1, wherein a content of the hexaboride particles (Component B-1) per 100 parts by weight of the other resin (Component B-2) is 1 to 50 parts by weight.

9. The resin composition of claim 1, wherein the nitride particles are nitride particles of at least one metal selected from the group consisting of Ti, Zr, Hf, V, Nb and Ta.

10. The resin composition of claim 1, which contains 0.005 to 5 parts by weight of a thermal stabilizer (Component C) per 100 parts by weight of Component A.

11. The resin composition of claim 1, which contains 0.005 to 5 parts by weight of a mold release agent (Component D) per 100 parts by weight of Component A.

12. The resin composition of claim 1, which contains 0.005 to 5 parts by weight of an ultraviolet absorbent (Component E) per 100 parts by weight of Component A.

13. A molded article formed of the resin composition of claim 1.

14. A method of producing the resin composition of claim 1, which comprises the steps of
   (i) mixing Component B-1, nitride particles (3) and Component B-2 to prepare Component B,
   (ii) mixing Component A and Component B to prepare a master batch, and
   (iii) mixing the master batch with Component A.

15. The method of claim 14, wherein 100 parts by weight of Component A and 0.1 to 20 parts by weight of Component B are mixed to prepare the master batch.

* * * * *